United States Patent
Itokazu

(10) Patent No.: US 11,179,857 B2
(45) Date of Patent: Nov. 23, 2021

(54) INTERFACE MECHANISM AND HORIZONTAL ARTICULATED ROBOT

(71) Applicant: FANUC CORPORATION, Yamanashi (JP)

(72) Inventor: Kenta Itokazu, Yamanashi (JP)

(73) Assignee: FANUC CORPORATION, Yamanashi (JP)

(\*) Notice: Subject to any disclaimer, the term of this patent is extended or adjusted under 35 U.S.C. 154(b) by 0 days.

(21) Appl. No.: 16/893,794

(22) Filed: Jun. 5, 2020

(65) Prior Publication Data
US 2021/0053236 A1 Feb. 25, 2021

(30) Foreign Application Priority Data
Aug. 23, 2019 (JP) ................. JP2019-153181

(51) Int. Cl.
| | |
|---|---|
| *H01R 33/945* | (2006.01) |
| *B25J 18/00* | (2006.01) |
| *F16J 15/06* | (2006.01) |
| *H01R 13/512* | (2006.01) |
| *H01R 13/52* | (2006.01) |
| *B25J 9/06* | (2006.01) |

(52) U.S. Cl.
CPC ............... *B25J 18/00* (2013.01); *F16J 15/06* (2013.01); *H01R 13/512* (2013.01); *H01R 13/5202* (2013.01); *B25J 9/06* (2013.01)

(58) Field of Classification Search
CPC ...... H01R 13/512; H01R 13/5202; B25J 9/06; B25J 18/00; F16J 15/06

USPC .......................................................... 439/577
See application file for complete search history.

(56) References Cited

U.S. PATENT DOCUMENTS

| | | | | |
|---|---|---|---|---|
| 946,434 | A * | 1/1910 | Hartenstein | H01R 9/16 439/87 |
| 4,545,632 | A * | 10/1985 | Maier | H01R 25/00 439/148 |
| 4,621,332 | A * | 11/1986 | Sugimoto | B25J 13/085 318/568.17 |
| 4,664,588 | A * | 5/1987 | Newell | B23Q 1/0063 294/86.4 |
| 4,690,495 | A * | 9/1987 | Giannini | G02B 6/32 385/57 |

(Continued)

FOREIGN PATENT DOCUMENTS

| | | |
|---|---|---|
| EP | 1396314 A1 | 3/2004 |
| JP | 2004-098174 A | 4/2004 |

(Continued)

*Primary Examiner* — Abdullah A Riyami
*Assistant Examiner* — Vladimir Imas
(74) *Attorney, Agent, or Firm* — Maier & Maier, PLLC

(57) ABSTRACT

An interface mechanism is provided in a cover of an arm of a horizontal articulated robot and connects a wiring member inside the arm and a wiring member outside the horizontal articulated robot to each other. The interface mechanism includes a fixed member that is disposed inside the arm and that is fixed to a cover, and also includes a connecting member that is attached to the fixed member and to which the wiring member inside the arm and the wiring member outside the horizontal articulated robot are connected. The fixed member is fixed to an inner surface of the cover in a state where the fixed member abuts against the inner surface from below.

7 Claims, 7 Drawing Sheets

(56) References Cited

U.S. PATENT DOCUMENTS

| | | | | |
|---|---|---|---|---|
| 4,722,703 | A * | 2/1988 | Hufnagl | C25B 9/66 |
| | | | | 439/781 |
| 4,766,775 | A * | 8/1988 | Hodge | B25J 9/08 |
| | | | | 74/490.01 |
| 4,875,275 | A * | 10/1989 | Hutchinson | B23B 31/113 |
| | | | | 279/93 |
| 4,886,375 | A * | 12/1989 | Tsukada | B23Q 11/0825 |
| | | | | 384/15 |
| 4,905,938 | A * | 3/1990 | Braccio | F16L 37/1205 |
| | | | | 244/101 |
| 4,954,952 | A * | 9/1990 | Ubhayakar | B25J 9/0084 |
| | | | | 244/172.5 |
| 5,460,536 | A * | 10/1995 | Cullen | B23K 11/364 |
| | | | | 439/289 |
| 5,850,762 | A * | 12/1998 | Kochanneck | B60K 1/04 |
| | | | | 74/490.03 |
| 5,955,888 | A * | 9/1999 | Frederickson | H05K 7/1061 |
| | | | | 324/750.25 |
| 8,158,883 | B2 * | 4/2012 | Softer | H02G 3/123 |
| | | | | 174/50 |
| 8,382,065 | B2 * | 2/2013 | Hendrickson | F25D 29/00 |
| | | | | 251/149 |
| 8,387,948 | B2 * | 3/2013 | Kuehl | F16L 37/20 |
| | | | | 251/149 |
| 9,475,199 | B2 * | 10/2016 | Burridge | B25J 9/06 |
| 10,160,121 | B2 * | 12/2018 | Lee | H01R 24/84 |
| 10,777,334 | B2 * | 9/2020 | Bilas | B60R 16/0207 |
| 10,913,147 | B2 * | 2/2021 | Adachi | B25J 18/04 |
| 10,958,014 | B1 * | 3/2021 | Martin | H01R 13/621 |
| 2002/0132522 | A1 * | 9/2002 | Miyazaki | H01R 13/74 |
| | | | | 439/559 |
| 2004/0052630 | A1 | 3/2004 | Nihei et al. | |
| 2010/0307279 | A1 * | 12/2010 | Campagna | B25J 15/04 |
| | | | | 74/490.05 |
| 2011/0136376 | A1 * | 6/2011 | Johnson | B25J 15/04 |
| | | | | 439/529 |
| 2012/0208404 | A1 * | 8/2012 | Matsumoto | H01R 13/447 |
| | | | | 439/661 |
| 2012/0238147 | A1 * | 9/2012 | Matsumoto | H01R 13/512 |
| | | | | 439/660 |
| 2013/0059467 | A1 * | 3/2013 | Johnson | B25J 19/0029 |
| | | | | 439/577 |
| 2013/0260606 | A1 * | 10/2013 | Hahakura | B25J 19/0029 |
| | | | | 439/534 |
| 2017/0297196 | A1 | 10/2017 | Koike et al. | |
| 2018/0032450 | A1 * | 2/2018 | Lee | H01R 13/6683 |
| 2019/0160680 | A1 | 5/2019 | Nagayama | |
| 2020/0307001 | A1 * | 10/2020 | Komatsu | B25J 19/0091 |

FOREIGN PATENT DOCUMENTS

| | | |
|---|---|---|
| JP | 2008-307637 A | 12/2008 |
| JP | 2015-123551 A | 7/2015 |
| JP | 2017-189862 A | 10/2017 |
| JP | 2019-093485 A | 6/2019 |

* cited by examiner

INTERFACE MECHANISM AND HORIZONTAL ARTICULATED ROBOT

CROSS-REFERENCE TO RELATED APPLICATIONS

This application is based on and claims priority to Japanese Patent Application No. 2019-153181 filed on Aug. 23, 2019, the content of which is incorporated herein by reference in its entirety.

FIELD

The present invention relates to interface mechanisms and horizontal articulated robots.

BACKGROUND

A known horizontal articulated robot in the related art includes a base, a first arm supported by the base in a horizontally rotatable manner, a second arm supported by the first arm in a horizontally rotatable manner, and a shaft supported by the second arm in a linearly movable manner in the vertical direction and in a rotatable manner around a vertical axis (e.g., see Japanese Unexamined Patent Application, Publication No. 2017-189862, Japanese Unexamined Patent Application, Publication No. 2015-123551, Japanese Unexamined Patent Application, Publication No. 2008-307637 and Japanese Unexamined Patent Application, Publication No. 2004-098174). Each of the arms contains therein wiring members, such as cables and pipes.

SUMMARY

An aspect of the present disclosure provides an interface mechanism that is provided in a cover of an arm of a horizontal articulated robot and that connects a wiring member inside the arm and a wiring member outside the horizontal articulated robot to each other. The arm is can be separated in a vertical direction into a base component and the cover that covers a space above the base component. The interface mechanism includes a fixed member that is disposed inside the arm and that is fixed to the cover, and also includes a connecting member that is attached to the fixed member and to which the wiring member inside the arm and the wiring member outside the horizontal articulated robot are connected. The fixed member is fixed to an inner surface of the cover in a state where the fixed member abuts against the inner surface from below.

DETAILED DESCRIPTION

An interface mechanism 1 and a horizontal articulated robot 10 according to an embodiment will now be described with reference to the drawings.

Figure 1:
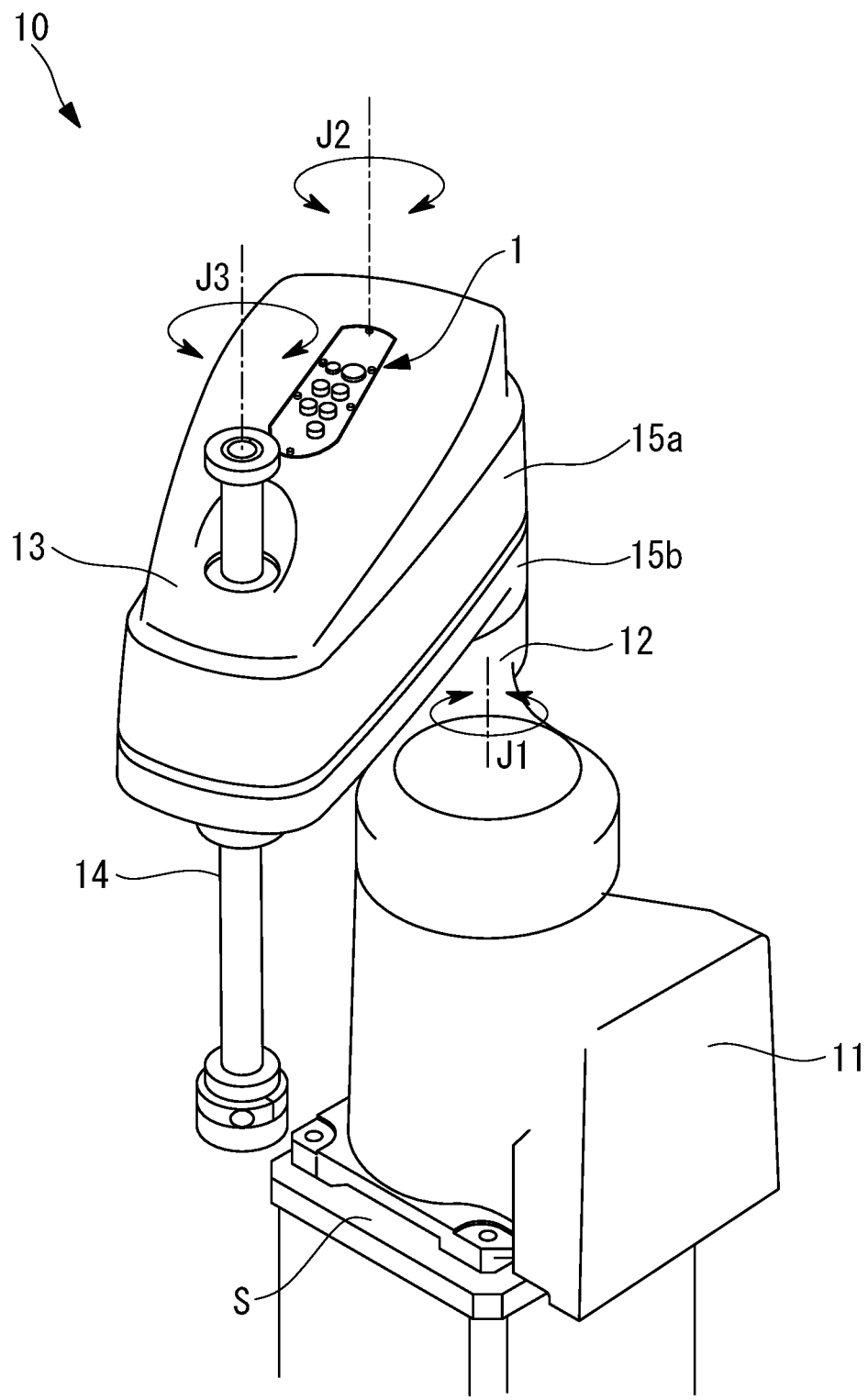
FIG. 1 is a perspective view of a horizontal articulated robot according to an embodiment.
Figure 2:
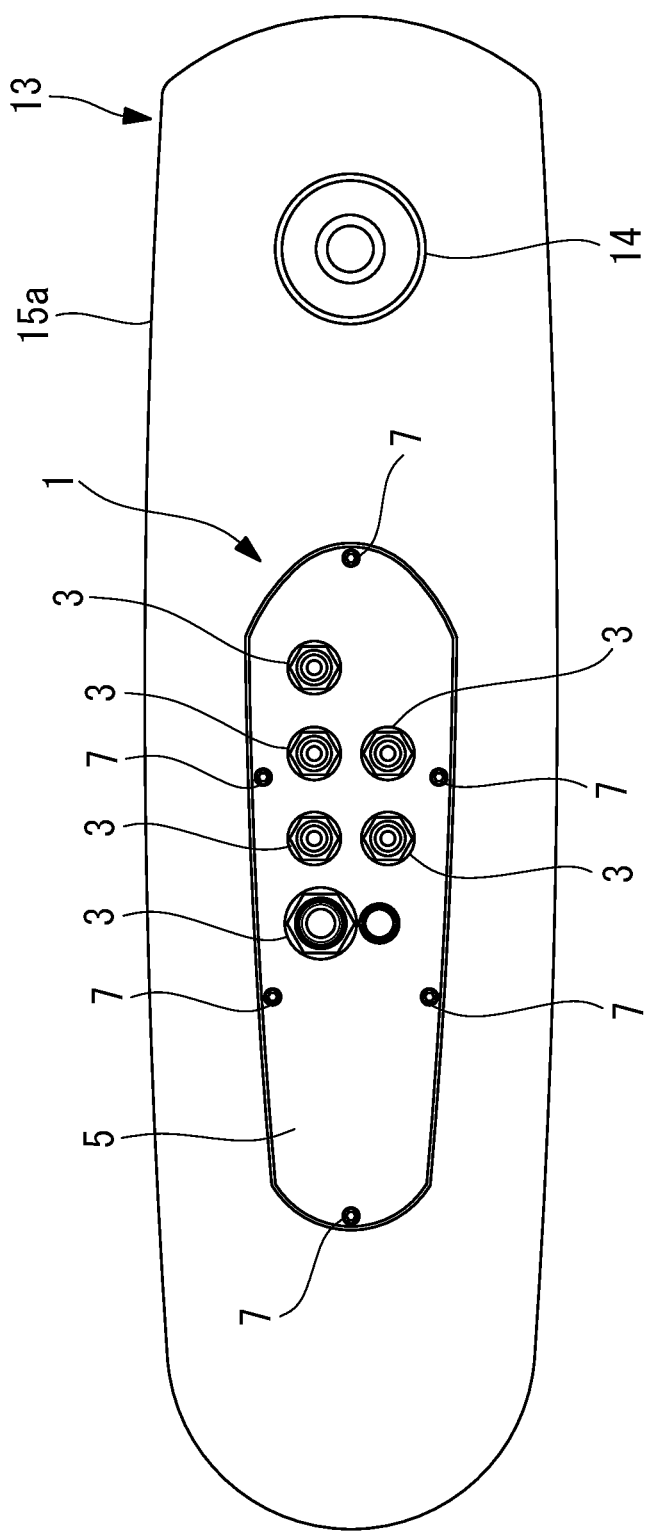
FIG. 2 is a plan view of a second arm of the horizontal articulated robot in FIG. 1, as viewed from above.

As shown in FIG. 1, the horizontal articulated robot 10 includes a base 11, a first arm 12, a second arm 13, and a shaft 14. Furthermore, as shown in FIG. 2, the horizontal articulated robot 10 includes the interface mechanism 1 that is attached to an upper wall of a cover 15a of the second arm 13.

The base 11 is fixed to an installation surface S.

One end of the first arm 12 is supported by the base 11 in a rotatable manner around a first axis J1, which is vertical, and the first arm 12 is rotatable in a horizontal direction relative to the base 11.

One end of the second arm 13 is supported by the other end of the first arm 12 in a rotatable manner around a second axis J2, which is vertical, so that the second arm 13 is rotatable in a horizontal direction relative to the first arm 12.

The shaft 14 is disposed coaxially with a third axis J3, which is vertical. The shaft 14 is supported by the other end of the second arm 13 in a linearly movable manner in the vertical direction along the third axis J3 and in a rotatable manner around the third axis J3. The lower end of the shaft 14 is connected to a tool (not shown), such as a hand.

The first axis J1, the second axis J2, and the third axis J3 are located apart from one another in the horizontal direction.

The second arm 13 is vertically separated into the cover 15a at the upper side and a base component 15b at the lower side. The base component 15b is a member to which, for example, a component 18, which will be described later, is fixed. The cover 15a is box-shaped having an open lower side and covering the space above the base component 15b, and has an upper wall disposed at the upper side and sidewalls extending downward from the edges of the upper wall. The cover 15a is composed of, for example, resin, and the base component 15b is, for example, a casting. The base component 15b is connected to the first arm 12 in a rotatable manner around the second axis J2.

Figure 3:
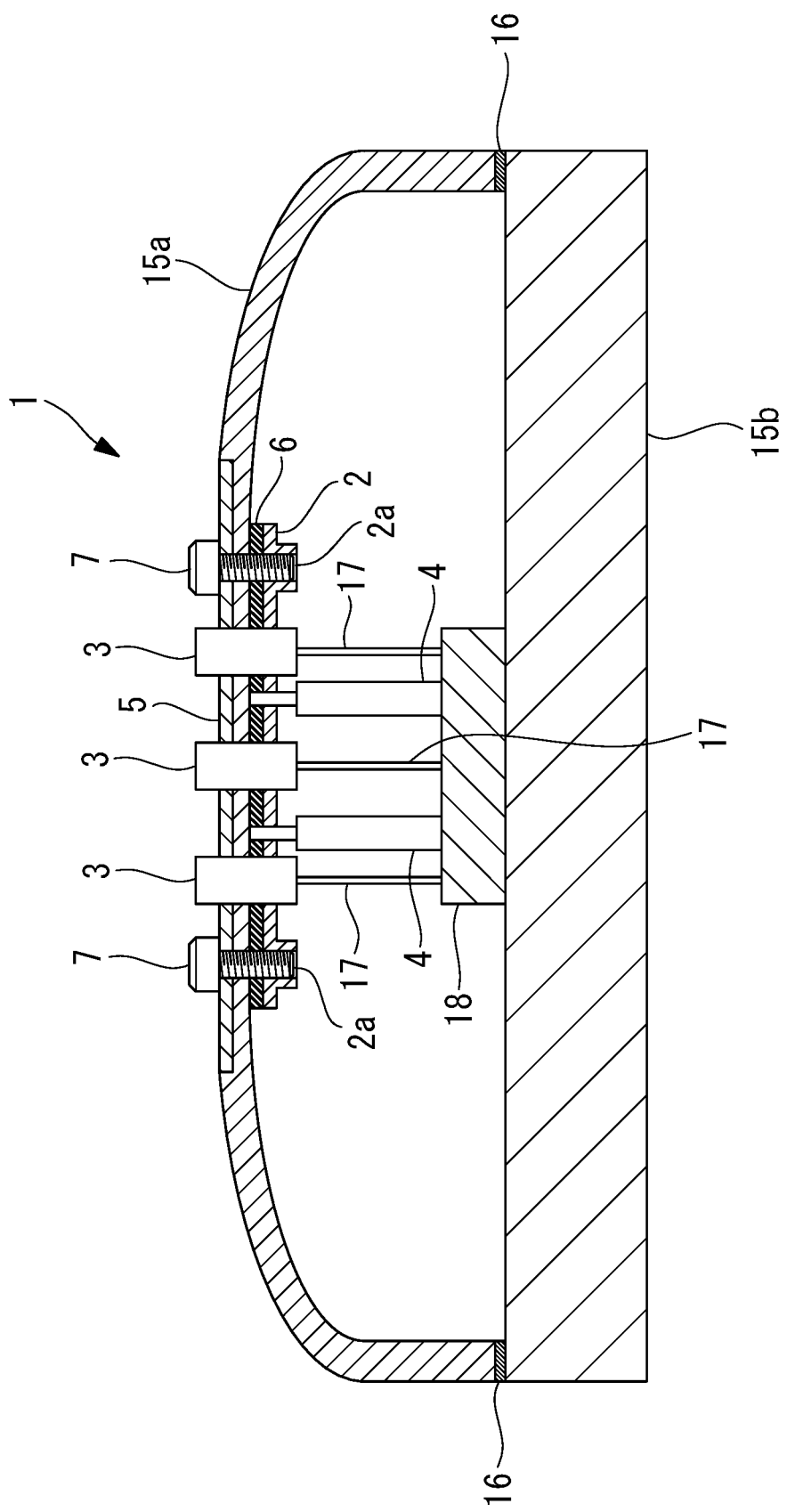
FIG. 3 is a schematic configuration diagram of an interface mechanism, illustrating a part of an internal configuration of the second arm of the horizontal articulated robot in FIG. 1.
Figure 4:
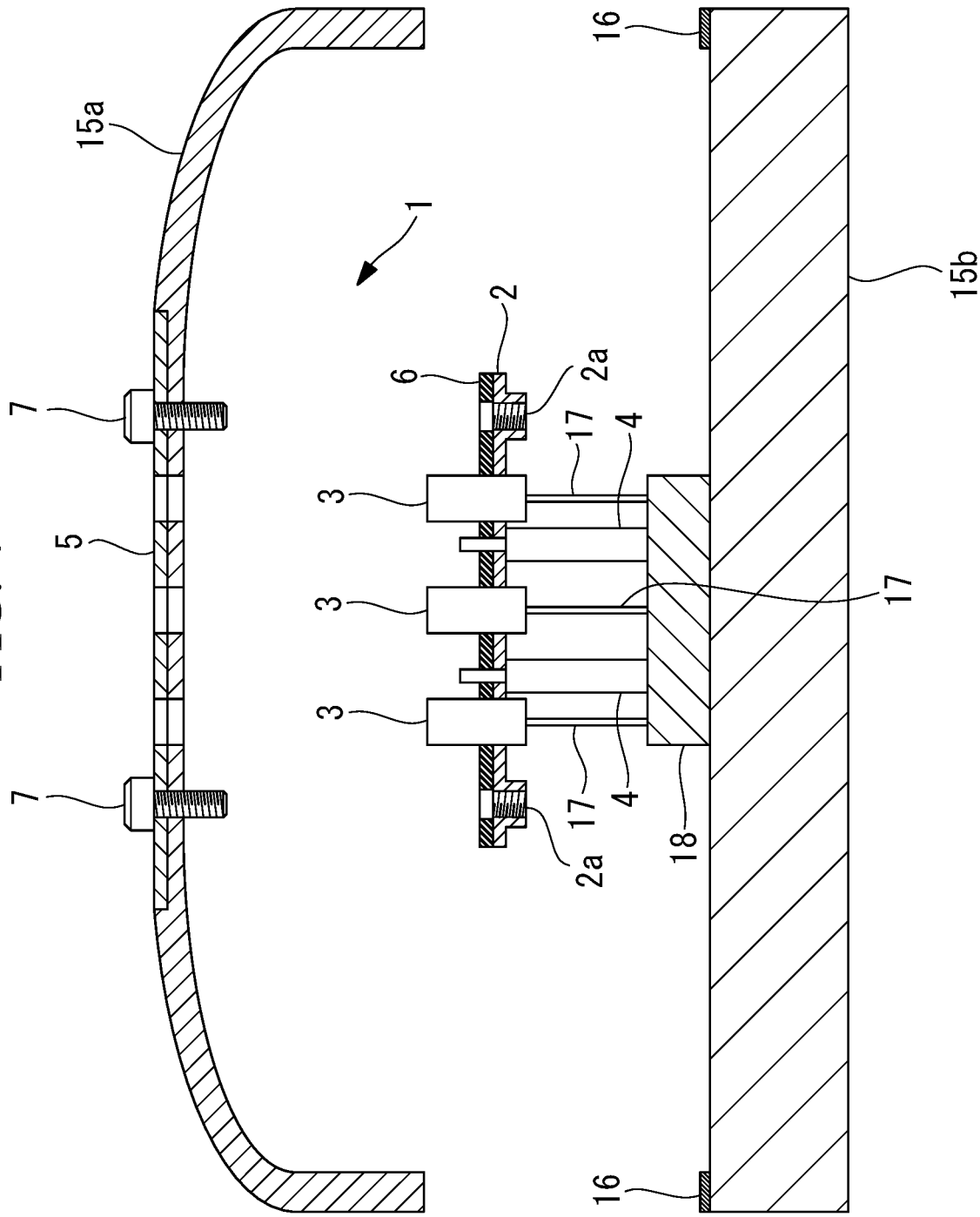
FIG. 4 illustrates the interface mechanism in a state where a cover of the second arm is detached from a base component.

FIG. 3 illustrates a state where the cover 15a is attached to the base component 15b, and FIG. 4 illustrates a state where the cover 15a is detached from the base component 15b. In the state where the cover 15a is attached to the base component 15b, a gap between the lower end surface of the cover 15a and the upper end surface of the base component 15b is sealed by a gasket 16.

As shown in FIGS. 3 and 4, the second arm 13 accommodates therein a plurality of wiring members 17 and the component 18 for driving a tool. Examples of the wiring members 17 include a cable for transmitting electric power and signals, and a pipe for delivering air. The component 18 is, for example, an electromagnetic valve. The wiring members 17 have a length that is equivalent to or substantially equivalent to the minimum wiring distance between the electromagnetic valve 18 and connecting members 3 (which will be described later) of the interface mechanism 1, and is wired between the electromagnetic valve 18 and the connecting members 3. The minimum wiring distance is the distance between the electromagnetic valve 18 and the lower end of each connecting member 3 in the state where the cover 15a is attached to the base component 15b.

The second arm 13 also accommodates therein other components (not shown). Examples of other components include a serve motor, pulley, and belt for driving the shaft 14.

The interface mechanism 1 is a connection unit that connects the wiring members 17 inside the second arm 13 and wiring members (not shown) outside the horizontal articulated robot 10 to each other, and is attached to the upper wall of the cover 15a, as shown in FIG. 2.

As shown in FIGS. 3 and 4, the interface mechanism 1 includes a fixed plate (fixed member) 2, a plurality of connecting members 3, a plurality of pillars (support parts) 4, a pushing plate (pushing member) 5, a gasket (sealing member) 6, and a plurality of bolts 7.

In the state where the cover 15a is attached to the base component 15b, the fixed plate 2, the pillars 4, and the gasket 6 are disposed inside the second arm 13, the pushing plate 5 is disposed outside the second arm 13, and the connecting members 3 and the bolts 7 are disposed astride the inside and the outside of the second arm 13.

The fixed plate 2 is a metallic flat plate disposed in a substantially horizontal manner. The fixed plate 2 has a plurality of female threads 2a with threaded holes into which the bolts 7 are screwed. The plurality of female threads 2a are located at mutually spaced positions along the peripheral edge of the fixed plate 2.

Each connecting member 3 is a connector to which an end of a cable is connected, or a joint to which an end of a pipe is connected. The connecting members 3 penetrate through the fixed plate 2 in the thickness direction of the fixed plate 2. The lower end of each connecting member 3 is disposed inside the second arm 13, and the upper end of each connecting member 3 is disposed outside the second arm 13. The ends of the wiring members 17 inside the second arm 13 are connected to the lower ends of the connecting members 3, and the ends of the wiring members outside the horizontal articulated robot 10 are connected to the upper ends of the connecting members 3.

Figure 5:
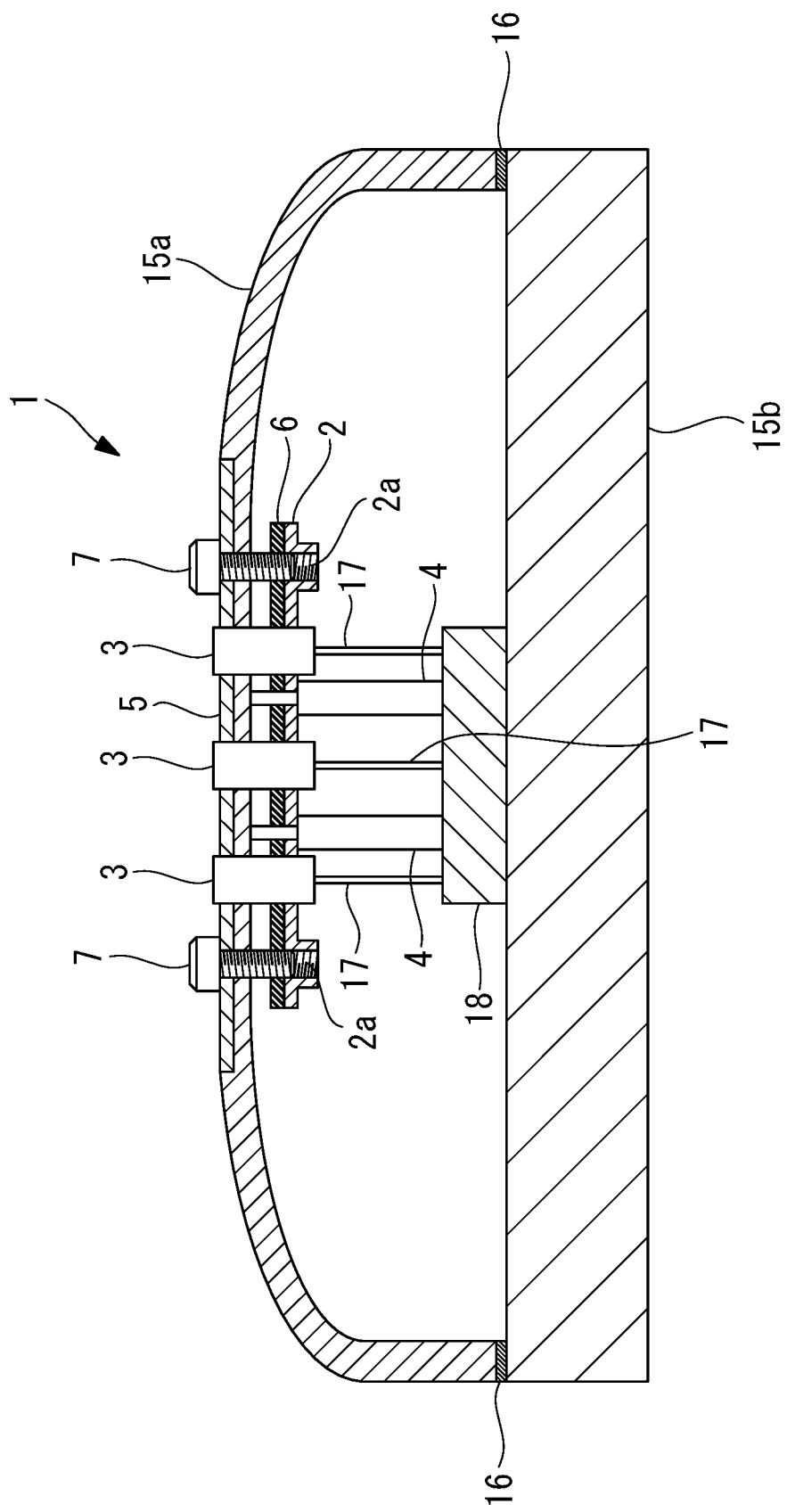
FIG. 5 illustrates the interface mechanism in a state where the cover of the second arm is attached to the base component and a fixed plate is not lifted upward yet.

The pillars 4 are disposed in a substantially vertical position, and the lower ends of the pillars 4 are fixed to the base component 15b. As shown in FIGS. 3 and 5, the pillars 4 support the fixed plate 2, which is not fixed to the cover 15a by the bolts 7, at the upper ends of the pillars 4 in a vertically movable manner between an upper position and a lower position. The upper position is where the fixed plate 2 abuts against the inner surface of the upper wall of the cover 15a, attached to the base component 15b, with the gasket 6 interposed therebetween (see FIG. 3). The lower position is lower than the upper position and is where the fixed plate 2 and the gasket 6 are separated downwardly from the inner surface of the upper wall of the cover 15a attached to the base component 15b (see FIG. 5).

For example, the fixed plate 2 has support holes penetrating therethrough in the thickness direction of the fixed plate 2. The pillars 4 each have an upper end that has a diameter smaller than that of the support hole and that penetrates through the support hole, and an abutment surface that has a diameter larger than that of the support hole and onto which the lower surface of the fixed plate 2 at the lower position is abutted.

In order to support the fixed plate 2 in a substantially horizontal position, the plurality of pillars 4 are disposed at a distance from each other in the horizontal direction.

Although the wiring members 17 are illustrated with straight lines in FIGS. 4 and 5, the wiring members 17 are slack when the fixed plate 2 is disposed at the lower position.

The pushing plate 5 is a flat plate having higher rigidity than the cover 15a and is, for example, a metallic plate. The pushing plate 5 is disposed on the upper surface of the upper wall of the cover 15a and faces the fixed plate 2 in the vertical direction. The pushing plate 5 and the upper wall of the cover 15a have through-holes that are provided at locations corresponding to the connecting members 3 and through which the connecting members 3 penetrate.

The gasket 6 is a splash-proof and dust-proof rubber sealing member and is provided on the upper surface of the fixed plate 2. The gasket 6 is provided at least along the entire periphery of the fixed plate 2 and seals the gap between the fixed plate 2 and the inner surface of the upper wall of the cover 15a. The gasket 6 is sandwiched in the vertical direction by the highly-rigid pushing plate 5 and the highly-rigid fixed plate 2, thereby exhibiting high dust-proof splash-proof performance.

The bolts 7 are provided for fixing the fixed plate 2 to the inner surface of the upper wall of the cover 15a. The bolts 7 are inserted into the female threads 2a of the fixed plate 2 from above penetrating through the pushing plate 5, the cover 15a, and the gasket 6, so as to be screwed from above into the female threads 2a at the lower position. Therefore, the pushing plate 5, the cover 15a, and the gasket 6 have through-holes that have a diameter larger than the outer diameter of the male threads of the bolts 7 and through which the bolts 7 passes. As the bolts 7 are screwed into the female threads 2a, the fixed plate 2 is lifted upward from the lower position toward the upper position. The bolts 7 can be screwed into the female threads 2a until the fixed plate 2 comes into abutment with the inner surface of the cover 15a. As the fixed plate 2 is lifted upward, the slackness in the wiring members 17 between the connecting members 3 and the electromagnetic valve 18 is removed.

Next, a method of how the interface mechanism 1 is attached to the cover 15a will be described.

As shown in FIG. 4, in the state where the cover 15a is detached from the base component 15b, the fixed plate 2 is supported by the pillars 4 and is disposed at the lower position, and the ends of the wiring members 17 extending from the electromagnetic valve 18 are connected to the lower ends of the connecting members 3. At this state, the fixed plate 2 is a member disposed below the cover 15a and is not fixed to the cover 15a. Thus, the pushing plate 5, the bolts 7, and the cover 15a can be collectively detached from the base component 15b while the fixed plate 2, the connecting members 3, the pillars 4, and the gasket 6 remain on the base component 15b side.

Subsequently, as shown in FIG. 5, the cover 15a is attached to the base component 15b, and the bolts 7 are inserted into the female threads 2a from the outer side of the second arm 13 via the through-holes in the pushing plate 5, the cover 15a, and the gasket 6 so that the bolts 7 are screwed into the female threads 2a. As the bolts 7 are screwed into the female threads 2a, the fixed plate 2 is lifted upward from the lower position, thereby stretching the slack wiring members 17. As shown in FIG. 3, the bolts 7 are screwed until the fixed plate 2 abuts against the inner surface of the cover 15a via the gasket 6, whereby the fixed plate 2 can be fixed to the cover 15a. In the state in FIG. 3, the gap between the cover 15a and the fixed plate 2 is sealed by the gasket 6.

After the cover 15a is attached to the base component 15b, the cover 15a can be detached from the base component 15b by loosening and removing the bolts 7 from the female threads 2a. Similar to the above, the pushing plate 5, the bolts 7, and the cover 15a can be collectively detached from the base component 15b while the fixed plate 2, the connecting members 3, the pillars 4, and the gasket 6 remain on the base component 15b.

Figure 6:
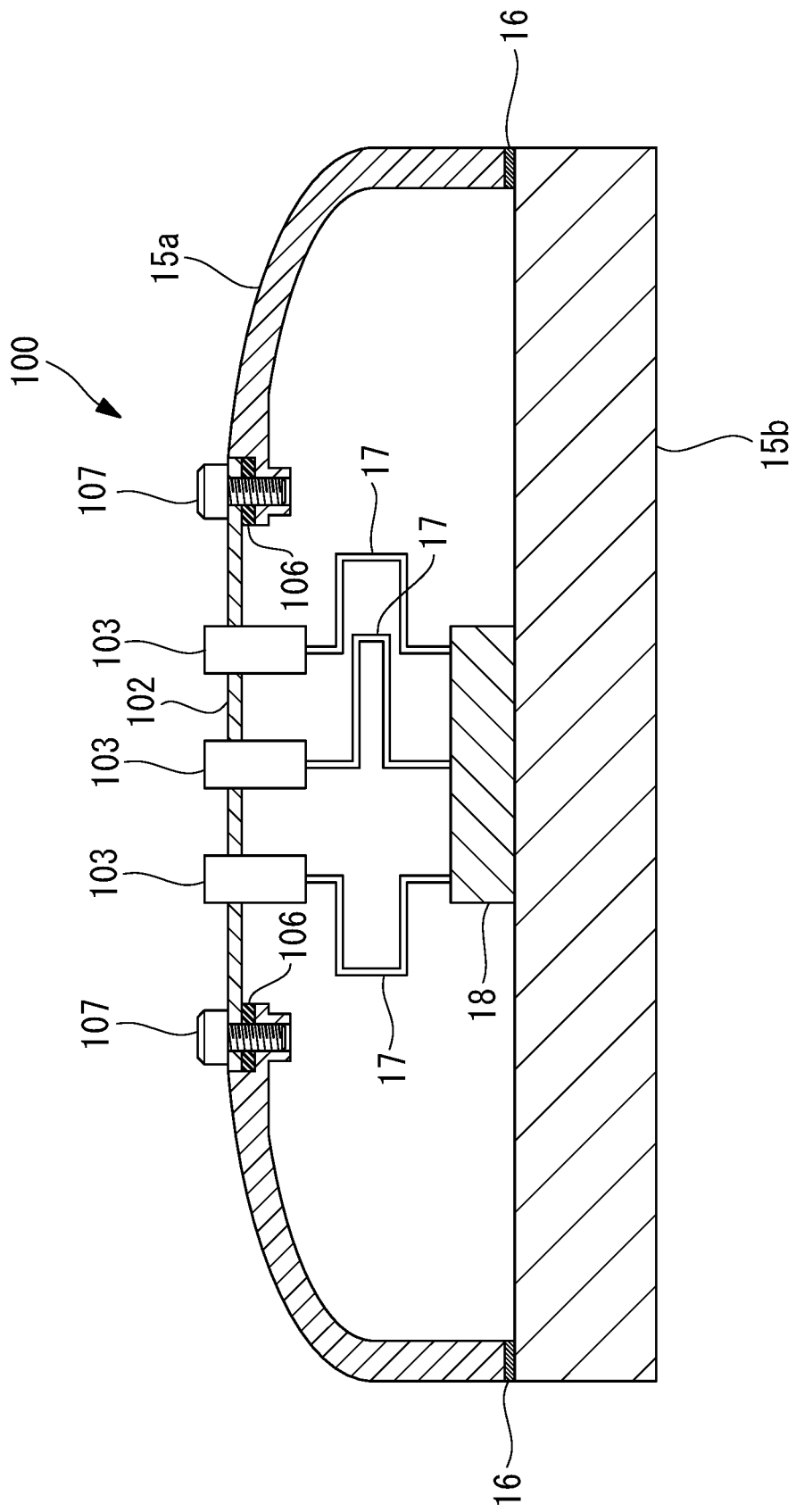
FIG. 6 schematically illustrates the configuration of an interface mechanism of a comparative example.
Figure 7:
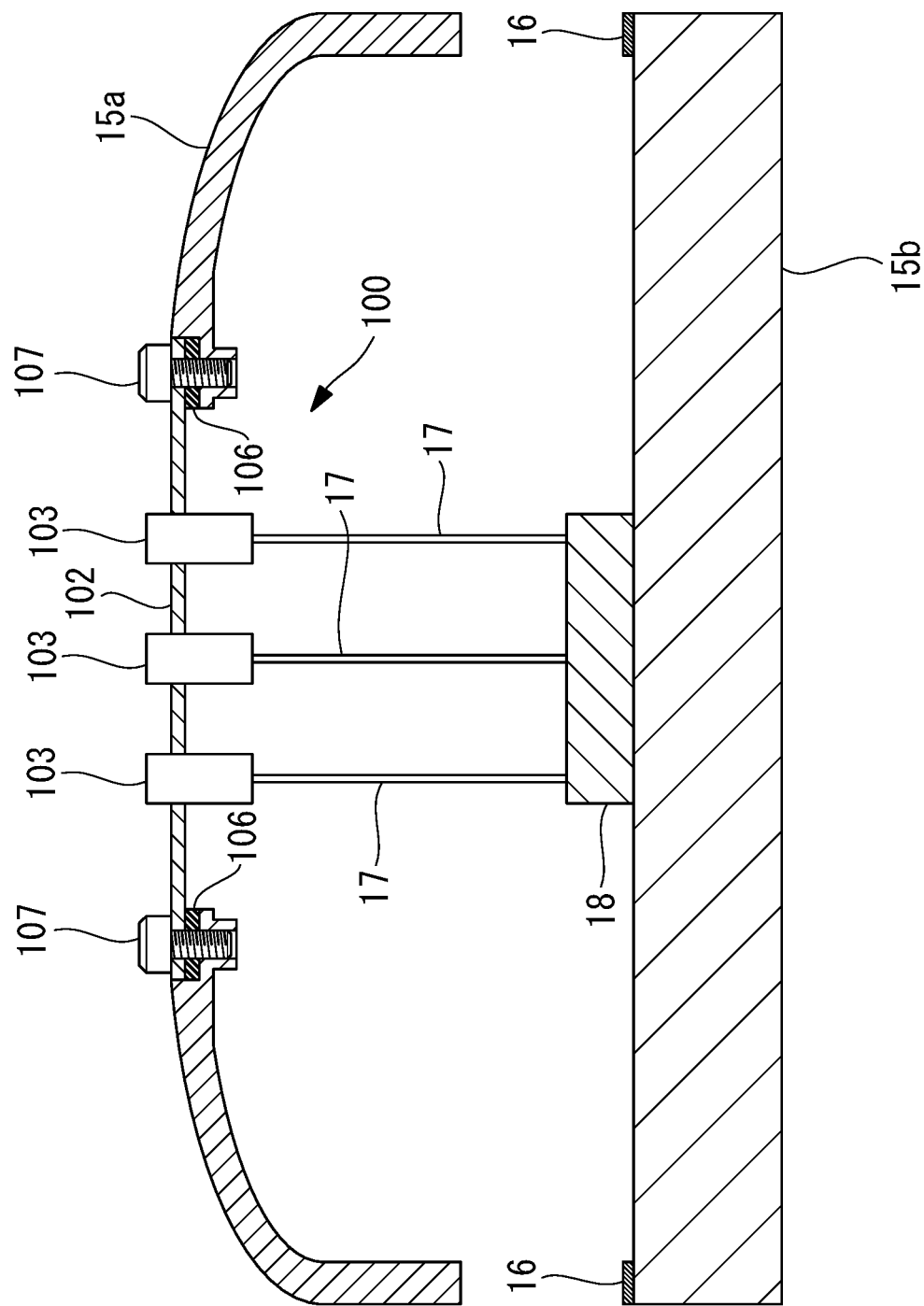
FIG. 7 illustrates the interface mechanism of the comparative example in a state where the cover of the second arm is detached from the base component.

FIGS. 6 and 7 illustrate an example of a conventional interface mechanism 100 according to a comparative example of the present invention.

In the interface mechanism 100, a fixed plate 102 is disposed on an upper surface of the cover 15a on the outer side of the second arm 13. In this case, as shown in FIG. 7, in order to wire the wiring members 17 between the electromagnetic valve 18 and connecting members 103 in a state where the cover 15a is detached from the base component 15b, or to detach the cover 15a from the base component 15b in a state where the wiring members 17 are wired between the electromagnetic valve 18 and the connecting members 103, the wiring members 17 need to have an sufficient length in addition to the minimum wiring distance. Thus, as shown in FIG. 6, the wiring members 17 slackens largely when the cover 15a is attached to the base component 15b. The slack wiring members 17 may possibly come into contact with other nearby components. In FIGS. 6 and 7, reference sign 106 denotes a gasket, and reference sign 107 denotes a bolt.

In contrast, in the interface mechanism 1 according to this embodiment, the fixed plate 2 is disposed inside the second arm 13 and is fixed to the cover 15a in a state where the fixed plate 2 abuts against the inner surface of the cover 15a from below. Such a fixed plate 2 can be fixed to the cover 15a by lifting the fixed plate 2 upward inside the second arm 13 after the cover 15a is attached to the base component 15b. Therefore, the fixed plate 2 does not have to be detached together with the cover 15a from the base component 15b, thereby eliminating the necessity for making the wiring members 17 excessively long. In this way, the wiring members 17 can be made to have a length that is equivalent to or substantially equivalent to the minimum wiring distance, and slackness in the wiring members 17 can be prevented.

Furthermore, in a case where the cover 15a is made of resin, it is difficult to manufacture the cover 15a with dimensions as designed, sometimes causing an error to occur in the dimensions of the cover 15a. If the cover 15a has a dimensional error, an error also occurs to a vertical position on the inner surface of the upper wall of the cover 15a. In this embodiment, the fixed plate 2 is supported by the pillars 4 in a vertically movable manner within the second arm 13. Therefore, the position of the fixed plate 2 can be adjusted vertically in accordance with the positional error in the inner surface of the cover 15a.

Furthermore, in this embodiment, the highly-rigid pushing plate 5 is provided on the cover 15a, so that the high dust-proof splash-proof performance of the gasket 6 can be improved, as compared with a case where the gasket 6 is sandwiched only by the fixed plate 2 and the cover 15a.

An error from a designed value may also occur in the minimum wiring distance of the wiring members 17 due to a dimensional error in the cover 15a. Thus, the wiring members 17 inside the second arm 13 may have a slightly extra length, which corresponds to an error range of the minimum wiring distance, in addition to the designed value for the minimum wiring distance of the wiring members 17. In this way, in a case where the minimum wiring distance is larger than the designed value, the wiring members 17 can be prevented from receiving excessive tension or from becoming detached from the connecting members 3 after the fixed plate 2 is lifted upward.

As an alternative to the above embodiment in which the fixed plate 2, before being fixed to the inner surface of the cover 15a, is supported by the pillars 4 in a movable manner, the unfixed fixed plate 2 may be disposed within the second arm 13 in any state where the fixed plate 2 can be lifted to a position where it abuts against the inner surface of the cover 15a.

For example, the fixed plate 2 may simply be disposed within the second arm 13. In this case, after the cover 15a is attached to the base component 15b, for example, the fixed plate 2 can be lifted upward by using a tool inserted into the second arm 13 via an opening provided in the cover 15a.

As an alternative to the above embodiment in which the fixed plate 2 is fixed to the cover 15a by using the bolts 7, the fixed plate 2 may be fixed to the cover 15a by using other means.

For example, after the wiring members 17 are wired and the cover 15a is attached to the base component 15b, the fixed plate 2 may be fixed to the cover 15a by being bonded thereto if the cover 15a is not to be detached again.

The invention claimed is:

1. An interface mechanism and that connects a wiring member inside the arm and a wiring member outside the horizontal articulated robot to each other, the arm capable of being separated, in a vertical direction, into a base component and a cover that covers a space above the base component, the interface mechanism comprising:
    a fixed member that is attached to the base component and that is disposed inside the arm;
    a connecting member that is attached to the fixed member and to which the wiring member inside the arm and the wiring member outside the horizontal articulated robot are connected; and
    a pushing member that comes into contact with an upper surface of the cover,
    wherein the fixed member is fixed to the pushing member so that a part of the cover is sandwiched between the fixed member and the pushing member.

2. The interface mechanism according to claim 1, wherein the wiring member inside the arm has an extra length, the extra length corresponding to an error range of a minimum wiring distance of the wiring member, in addition to the minimum wiring distance.

3. The interface mechanism according to claim 1, further comprising:
    a support part that is disposed inside the arm and that is fixed to the base component,
    wherein the support part supports the fixed member in a vertically movable manner between an upper position and a lower position before the fixed member is fixed to the pushing member, the upper position is a position where the fixed member abuts against the part of the cover, and the lower position is a position where the fixed member is distant from the part of the cover.

4. The interface mechanism according to claim 1, further comprising:
    a sealing member that is provided on an upper surface of the fixed member and that seals a gap between the fixed member and the part of the cover.

5. The interface mechanism according to claim 4, wherein the pushing member has higher rigidity than the cover,
    wherein the sealing member is sandwiched between the fixed member and the pushing member.

6. The interface mechanism according to claim 1, further comprising:
a bolt that fixes the fixed member to the pushing member, wherein the bolt penetrates through the cover and the bolt is screwed into a female thread of the fixed member from above.

7. A horizontal articulated robot comprising an interface mechanism that connects a wiring member inside the arm and a wiring member outside the horizontal articulated robot to each other, the arm capable of being separated, in a vertical direction, into a base component and a cover that covers a space above the base component, the interface mechanism comprising:
a fixed member that is attached to the base component and that is disposed inside the arm;
a connecting member that is attached to the fixed member and to which the wiring member inside the arm and the wiring member outside the horizontal articulated robot are connected, and
a pushing member that comes into contact with an upper surface of the cover,
wherein the fixed member is fixed to the pushing member so that a part of the cover is sandwiched between the fixed member and the pushing member.

* * * * *